Figure 1:
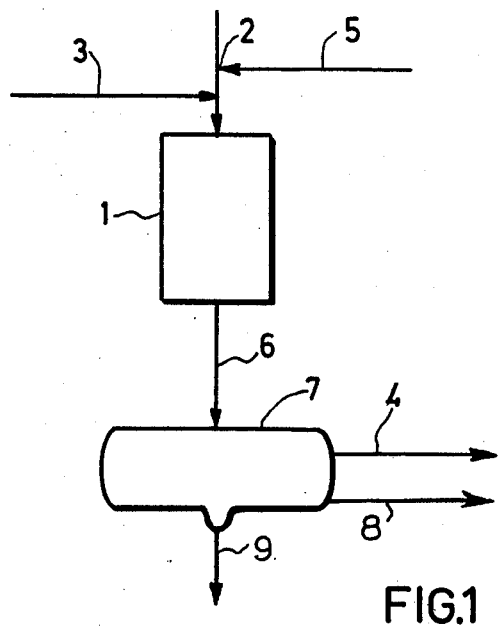

United States Patent [19]

Marty et al.

[11] Patent Number: 4,466,906

[45] Date of Patent: Aug. 21, 1984

[54] CATALYST FOR THE OXIDATION OF MERCAPTANS TO DISULFIDES, PROCESS FOR THE PREPARATION THEREOF, AND ITS USE IN THE SWEETENING OF PETROLEUM DISTILLATES

[75] Inventors: Claude Marty; Philippe Engelhard, both of Le Havre, France

[73] Assignee: Compagnie Francaise de Raffinage, Paris, France

[21] Appl. No.: 483,631

[22] Filed: Apr. 7, 1983

[30] Foreign Application Priority Data

Apr. 9, 1982 [FR] France .................................. 82 06259

[51] Int. Cl.$^3$ .......................... B01J 31/04; B01J 31/12
[52] U.S. Cl. ..................................... 502/11; 208/191; 208/207; 502/159; 502/167; 502/170
[58] Field of Search ................................ 208/191, 207; 252/431 N, 431 C, 426

[56] References Cited

U.S. PATENT DOCUMENTS

| | | | |
|---|---|---|---|
| 4,090,954 | 5/1978 | Ward | 252/431 N |
| 4,111,856 | 9/1978 | Haag et al. | 252/431 N |
| 4,206,043 | 6/1980 | Carlson | 208/207 |
| 4,298,502 | 11/1981 | Carlson | 252/431 N |
| 4,317,936 | 3/1982 | Kim et al. | 252/431 P |

Primary Examiner—Delbert E. Gantz
Assistant Examiner—Chung Pak
Attorney, Agent, or Firm—Curtis, Morris & Safford

[57] ABSTRACT

A catalyst suited for use in the sweetening of petroleum distillates (by oxidizing mercaptans to disulfides) which is formed of a metal complex of a polyaminoalkylpolycarboxylic acid deposited directly on a basic anion exchange resin. The method of making the source by exchanging a metal cation on an acidic resin; forming a complex by the action of a polyaminoalkylpolycarboxylic acid upon said resin; and exchanging the complex so formed on a basic anion exchange resin.

12 Claims, 2 Drawing Figures

CATALYST FOR THE OXIDATION OF MERCAPTANS TO DISULFIDES, PROCESS FOR THE PREPARATION THEREOF, AND ITS USE IN THE SWEETENING OF PETROLEUM DISTILLATES

The present invention relates to a novel catalyst and its use in the sweetening of petroleum fractions by conversion of the mercaptans to disulfides.

As is known, wide use is made industrially of the property exhibited by the chelates of certain metals (copper, cobalt, vanadium and nickel) of catalyzing the conversion of mercaptans to disulfides in the presence of oxygen. This property is being utilized to sweeten natural gasoline, gasolines obtained by distillation or cracking, naphtha, kerosene, aviation gasoline and solvents of any composition by the use of cobalt phthalocyanine, for example, in an aqueous alkaline medium.

Sweetening may also be effected by the use of an oxidation catalyst deposited on a carrier that is insoluble in soda and hydrocarbons. In a process of this type, described in French Pat. No. 1,301,844, the hydrocarbon feedstock is contacted with a fixed bed of cobalt phthalocyanine on activated carbon in the presence of air and an alkaline reagent.

However, this technique is afflicted with numerous drawbacks due, in particular, to the difficulties which impregnation of the carrier with the chelate entails and to the tendency of the chelate to desorb, which necessitates costly carrier reimpregnation operations.

It is known that most catalysts which have been deposited on a fixed bed of activated carbon, or of any other carrier, such as alumina or silica, are not always sufficiently well bonded to the carrier and under certain conditions may therefore be swept out of the reactor with the treated charge.

Those skilled in the art who have concerned themselves with this problem of the fixed bed have therefore sought to bond catalysts more firmly to their carriers and to that end have proposed the use of various resins as carriers.

Thus, U.S. Pat. No. 3,396,123 describes the preparation of a new type of carrier by heating a mixture of thermoplastic resin and activated carbon.

U.S. Pat. No. 4,145,486 describes the use of various types of metal complexes deposited on ion-exchange resins in other reaction areas and, in particular, in homogeneous catalysis.

French patent application No. 2,202,726, filed by the present assignee, describes the use as sweetening catalysts of metals in the state of ions or in the state of complexes which are deposited by impregnation, and only by impregnation, on an ion-exchange resin of the type of poly-4-vinylpyridine crosslinked with divinylbenzene. The metal compound used is cobaltous naphtenate, for example.

In pursuing their research, applicants have found that metal complex ions can be deposited directly on ion-exchange resins by exchange rather than by impregnation.

The invention thus has as a preferred embodiment a catalyst for the oxidation of mercaptans to disulfides which is characterized in that it is formed of a metal complex of a polyaminoalkylpolycarboxylic acid which is deposited directly on a basic anion exchange resin.

The catalysts in accordance with the invention are formed, in particular, of complexes of metals comprising especially cobalt, zinc, nickel, iron, copper, vanadium, titanium, chromium or molybdenum with a polyaminoalkylpolycarboxylic acid which are deposited on a basic anion exchange resin. These catalysts make possible the sweetening of mercaptans contained in petroleum fractions under particularly attractive conditions.

The present invention further relates to the preparation of this novel catalyst by exchange of a metal complex ion with the anions of a carrier resin. This operation may be carried out, in particular, in three steps by the following general scheme:

In a first step, the exchange of the cation which it is desired to deposit is carried out on an acidic resin in accordance with the following reaction formula, for example:

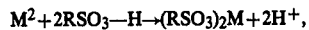

$$M^{2+} + 2RSO_3-H \rightarrow (RSO_3)_2M + 2H^+,$$

wherein M represents a metal such as cobalt, zinc, nickel, iron, copper, vanadium, titanium, chromium or molybdenum and R is a group of the styrenedivinylbenzene type.

The second step consists in the formation of the metal complex in accordance with a reaction such as this:

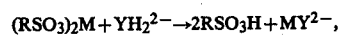

$$(RSO_3)_2M + YH_2{}^{2-} \rightarrow 2RSO_3H + MY^{2-},$$

wherein Y represents an ethylenediaminetetraacetic group, for example.

The complexing agent used is one of the compounds having at least one aminoacetic group, such as the polyaminoalkylpolycarboxylic acids, which include ethylenediaminetetraacetic acid, nitrolotriacetic acid, cyclodiaminetriacetic acid, hydroxyethylenediaminetriacetic acid, diethylenetriamine pentaacetic acid and the respective salts, the preferred complexing agent in accordance with the present invention being the disodium salt of ethylenediaminetetraacetic acid.

Finally, in a third step, the $MY^{2-}$ complex is exchanged with the anions of a basic resin.

A large number of basic anion exchange resins is suited for use in accordance with the invention, particularly those which contain at least one primary, secondary and/or tertiary amine functional group, the latter two being among the most active. Some of these resins are available commercially, particularly those trademarked AMBERLYST, AMBERLITE and DUOLITE.

The exchange reaction with a resin containing at least one tertiary amine functional group may proceed in accordance with the formula:

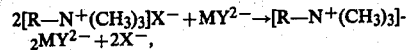

$$2[R-N^+(CH_3)_3]X^- + MY^{2-} \rightarrow [R-N^+(CH_3)_3]_2MY^{2-} + 2X^-,$$

wherein M, R and Y have the meanings given above and $X^-$ is a halide ion, for example, a chloride ion.

Figure 2:
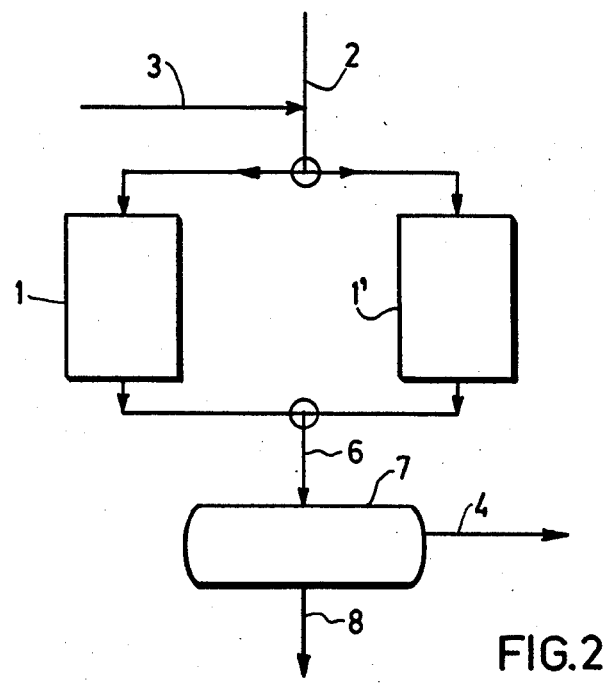

The sweetening of the mercaptans contained in the petroleum fractions to disulfides by the use of the catalyst of the invention may be carried out by one of two processes described below with reference to the accompanying drawings, wherein:

FIG. 1 illustrates the sweetening of a gasoline with continuous injection of an aqueous soda or potash solution into the reactor, and FIG. 2 illustrates the sweetening of a gasoline without the addition of soda to the gasoline, that is to say, strictly in an anhydrous medium.

According to FIG. 1, the gasoline to be sweetened is fed to a reactor 1 through a line 2. The reactor 1 contains a catalyst in accordance with the invention in a fixed bed. Air is introduced into the reactor 1 through a line 3, and a basic solution is fed to it through a line 5. The sweetened charge is conducted from the reactor through a line 6 to a separator 7, from which the air, the soda and the sweetened gasoline are withdrawn through lines 4, 8 and 9, respectively.

According to FIG. 2, the gasoline to be sweetened is introduced into a reactor 1 through a line 2 with air coming from a line 3. As in the preceding case, the charge leaves the reactor through a line 6 and is fed to a liquid/gas separator 7, from which the air and the sweetened gasoline are withdrawn through lines 4 and 8, respectively. After an operating cycle, the charge may be fed to a parallel-connected reactor 1', and the catalyst used in reactor 1 may then be regenerated.

The fixed beds in the reactors 1 and 1' contain the resins based on metal polyaminopolycarboxylates according to the invention, mixed directly with solid soda or potash in a proportion of from 5 to 25 weight percent anhydrous potash or soda.

In the performance of the sweetening reaction in accordance with the present invention, the reaction temperature is not particularly critical. The reaction may be carried out at ambient temperature; but higher temperatures may also be employed, although temperatures of about 120° C. should not be exceeded. The pressure should range from 1 to 50 bars, and preferably from 2 to 30 bars.

The most appropriate oxidizing agent is air. However, any other oxidant, such as pure oxygen, may be used, as may any other gas or gas mixture containing oxygen. The latter may be introduced into the reactor in stoichiometric proportions. Frequently it is preferably used in excess.

The examples which follow will serve to illustrate the practice of the process of the present invention without limiting it.

EXAMPLE 1

This example relates to the preparation of a copper-based catalyst.

First step

To a column with a height/diameter ratio of about 12, there was charged 90 g Amberlyst A 15 which had first been swelled in distilled water. 50 g of copper sulfate ($CuSO_4.5H_2O$) dissolved in 500 cm$^3$ of water was then passed over it. This was followed by washing with distilled water until a colorless solution was obtained.

Second step

To form the EDTA-copper complex, 800 cm$^3$ of a 5 wt. % solution of ethylenediaminetetraacetic acid whose pH had been adjusted to 6 was passed over the resin so obtained.

The effluents collected at the outlet end of the resin bed were of blue color. The pH of that solution was also adjusted to 6.

Third step 80 g moist Amberlyst A 26 (60% water) was introduced into a column identical with the preceding one. This resin comes in chloride form. The chloride ions were exchanged by means of an 0.5N solution of soda (2 liters). The resin was then washed until a neutral pH was obtained.

The freshly prepared solution containing the copper complex was then passed over the resin. (Duration: About 8 hours.)

The resin was then washed with distilled water for elimination of all traces of unbound copper. Then it was dried for 18 hours at 40° C. and a pressure of 20 mm Hg.

EXAMPLE 2

This example relates to the preparation of a cobalt-based catalyst.

First step

To a column with a height/diameter ratio of about 12, there was charged 60 g Amberlyst A 15 (swollen in water), and 40 g cobaltous nitrate ($Co(NO_3)$). $6H_2O$) dissolved in 400 cm$^3$ of water (a wine-red solution) was then passed over it. This was followed by washing until a colorless solution was obtained.

Second step

To form the EDTA-cobalt complex, 550 cm$^3$ of a 5 wt. % solution of EDTA whose pH had been adjusted to 6 was passed over the resin so obtained. The effluents collected at the outlet were of red color. The pH of this solution was adjusted to 6.

Third step 55 g moist Amberlyst A 26 in chloride form was introduced into a column identical with the preceding one and the freshly prepared solution containing the cobalt complex was then passed over it.

The effluent solution, of pH 7, was colorless while the resin had assumed a red color.

A test with silver nitrate run on the effluent revealed the presence of chloride ions.

The resin was then washed until the wash water was colorless. (Duration: 8 hours.) Then it was dried for 18 hours at 40° C. at a pressure of 20 mm Hg.

EXAMPLE 3

This example relates to the sweetening of a gasoline over a copper-based catalyst, without addition of soda to the gasoline, in accordance with the flow sheet of FIG. 2.

The resin prepared according to Example 1 was mixed with solid potash in a weight ratio of 90% resin to 10% powdered potash. It was then placed in the tubular reactor 1 of FIG. 2.

The tests were conducted with a charge of synthetic catalytic gasoline composed of 50 wt. % heptane, 30% heptene and 20% benzene and containing 1000 ppm tert-butyl mercaptan.

The charge to be sweetened was placed in a tank supplying the reactor 1 through the line 2 with an air inlet (line 3).

The operating conditions of the reaction were as follows:

| | |
|---|---|
| Catalyst volume | 20 cm$^3$ |
| Relative pressure | 0.5 bar |
| Temperature | 30° C. |
| Volume of air per gram of mercaptan | 6 standard liters/gram |
| Hourly space velocity of charge (volume of charge passing over a unit volume of catalyst per hour) | 1 |

After treatment in the reactor, the effluent was separated in separator 7 from the air which it contained. Analysis of the effluent showed that the sulfur from the mercaptans had been converted to disulfides over a period of 400 hours, the degree of sweetening being over 95%.

EXAMPLE b 4

This example relates to the treatment of an industrial feedstock.

The test was carried out under the same conditions as in the preceding example with an industrial feedstock consisting of a 50/50 mixture (by volume) of light gasoline and heavy gasoline obtained by catalytic cracking.

The feedstock, whose specific gravity at 15° C. was 0.779, contained 34.1% aromatic compounds, 27.2% olefins and 38.7% saturated hydrocarbons. It further contained about 800 ppm phenols, 200 to 400 ppm mercaptan sulfur, and 1000 to 2000 ppm total sulfur.

The operating conditions were as follows:

| | |
|---|---|
| Catalyst volume | 20 cm$^3$ |
| Relative pressure | 0.5 bar |
| Temperature | 30° C. |
| Volume of air per gram of mercaptan | 2 standard liters/gram |
| Hourly space velocity of charge | 1 to 4 |

Notwithstanding the variations in the hourly space velocity, the gasoline was sweetened over a period of 500 hours, during which time the phenol concentration of the charge dropped to 28 ppm.

EXAMPLE 5

This example relates to the sweetening of an industrial feedstock over a cobalt-based catalyst.

A feedstock analogous to that of Example 4 was treated under the same conditions as in that example with a cobalt-based catalyst prepared in accordance with Example 2 and mixed with 10 wt. % solid potash.

The sweetened gasoline had the following characteristics, as contrasted with the charge:

| | Charge | Effluent |
|---|---|---|
| Total sulfur, ppm | 2000 | 1970 |
| Mercaptans, ppm | 400 | — |
| Phenols, ppm | 900 | 600 |
| ASTM color | ≦0.5 | ≦0.5 |
| Cobalt, ppm | 0 | 0 |
| Gums, mg/100 ml | | |
| unwashed | 45 | 10 |
| washed | 39 | 4 |

EXAMPLE 6

This example relates to the sweetening of a gasoline over an iron-based catalyst.

The gasoline was an industrial gasoline containing 400 ppm of mercaptan sulfur which was treated under conditions similar to those of Example 4.

The operating conditions were as follows:

| | |
|---|---|
| Temperature | 30 to 50° C. |
| Relative pressure | 0.5 bar |
| Volume of air per gram of mercaptan | 2.4 standard liters/gram |
| Hourly space velocity of charge | 1 |

It was found that the effluent contained no iron and that over a period of more than 50 hours the charge had been sweetened to mercaptan contents of less than 8 ppm.

EXAMPLE 7

This example relates to the sweetening of an industrial gasoline over a nickel-based catalyst.

The gasoline was the same as in the preceding example. It was treated by means of a nickel-based catalyst prepared in the same manner as the cobalt catalyst.

The operating conditions were as follows:

| | |
|---|---|
| Temperature | 30° C. |
| Relative pressure | 0.5 bar |
| Volume of air per gram of mercaptan | 2.7 standard liters/gram |
| Hourly space velocity of charge | 1 |

The effluent contained no nickel. Over a period of more than 70 hours, the charge had been sweetened to mercaptan contents of less than 2 ppm.

EXAMPLE 8

This example relates to the sweetening of a charge over a resin with the addition of soda in accordance with the flow sheet of FIG. 1.

A cobalt-based resin was prepared in accordance with Example 2 and mixed with solid potash in a weight ratio of 90% resin and 10% powdered potash. The catalyst was placed in the reactor 1 of FIG. 1.

A charge of the same type as in Example 4 with 1074 ppm total sulfur was injected into that reactor through line 2.

Throughout the time of injection, a 3.4 wt. % solution of soda in a mixture of methanol and water (weight ratio, 75:25) was introduced continuously through line 5 at the rate of 200 ppm, based on the charge.

The conditions and results of this test are given in the table which follows.

| Time (hours) | Temperature (°C.) | Pressure (bars) | Hourly space velocity | Std. ltrs. air g sulfur mercaptan | NaOH sol'n charge (ppm) |
|---|---|---|---|---|---|
| 0–50 | 30 | 8 | 1 | 2.2 | 200 |
| 50–290 | 30 | 8 | 2 | 3.4 | 200 |
| 290–310 | 30 | 20 | 1.5 | 2.2 | 266 |
| 310–450 | 50 | 20 | 1.5 | 2.2 | 266 |

During the first 250 hours of the test, the mercaptan concentration in the effluents was less than 2.5 ppm of mercaptan sulfur. This concentration increased slightly thereafter without, however, exceeding 5 ppm after 450 hours of operation.

I claim:

1. A catalyst for the oxidation of mercaptans to disulfides, which comprises a metal complex of a polyaminoalkylpolycarboxylic acid deposited directly on a basic anion exchange resin.

2. A catalyst according to claim 1, wherein the polyaminoalkylpolycarboxylic acid is ethylenediaminetetraacetic acid or one of its salts.

3. A catalyst according to claim 1, wherein the metal used to form the complex is a metal selected from the group consisting of cobalt, nickel, iron, zinc, copper, vanadium, titanium, chromium and molybdenum.

4. A catalyst according to claim 1, wherein the metal used to form the complex is a metal selected from the group consisting of cobalt, copper, nickel and iron.

5. A catalyst according to claim 1, wherein the basic anion exchange resin contains at least one amine functional group.

6. A catalyst according to claim 1, wherein the basic anion exchange resin contains at least one quaternary ammonium functional group.

7. A catalyst according to claim 2, wherein the metal used to form the complex is a metal selected from the group consisting of cobalt, copper, nickel and iron.

8. A catalyst according to claim 2, wherein the basic anion exchange resin contains at least one amine functional group.

9. A catalyst according to claim 7, wherein the basic anion exchange resin contains at least one amine functional group.

10. A catalyst according to claim 2, wherein the basic anion exchange resin contains at least one quaternary ammonium functional group.

11. A catalyst according to claim 7, wherein the basic anion exchange resin contains at least one quaternary ammonium functional group.

12. A process for the preparation of a catalyst according to claim 1 for use in the oxidation of mercaptans to disulfides, which comprises the following three steps:
 exchanging a metal cation on an acidic resin;
 forming a complex by the action of a polyaminoalkylpolycarboxylic acid upon said resin; and
 exchanging the complex so formed on a basic anion exchange resin.

* * * * *

UNITED STATES PATENT AND TRADEMARK OFFICE
CERTIFICATE OF CORRECTION

PATENT NO. : 4,466,906

DATED : Aug. 21, 1984

INVENTOR(S) : Claude Marty and Philippe Engelhard

It is certified that error appears in the above-identified patent and that said Letters Patent is hereby corrected as shown below:

Column 8, line 11 (claim 12, line 5) insert --metal-- before "complex".

Column 8, line 12 (claim 12, line 6) insert --exchanged-- before "resin".

Signed and Sealed this

Twenty-first Day of May 1985

[SEAL]

Attest:

DONALD J. QUIGG

Attesting Officer

Acting Commissioner of Patents and Trademarks